US008078851B2

(12) United States Patent
Chiou et al.

(10) Patent No.: US 8,078,851 B2
(45) Date of Patent: Dec. 13, 2011

(54) PROCESSOR AND METHOD FOR RECOVERING GLOBAL HISTORY SHIFT REGISTER AND RETURN ADDRESS STACK THEREOF BY DETERMINING A REMOVAL RANGE OF A BRANCH RECOVERY TABLE

(75) Inventors: Guan-Ying Chiou, Taoyuan County (TW); Yuan-Jung Kuo, Taipei County (TW); Hui-Chin Yang, Hsinchu (TW); Tzu-Min Chou, Taipei (TW); Shun-Chieh Chang, Taichung County (TW); Chung-Ping Chung, Hsinchu (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 405 days.

(21) Appl. No.: 12/338,591

(22) Filed: Dec. 18, 2008

(65) Prior Publication Data

US 2010/0161951 A1 Jun. 24, 2010

(51) Int. Cl.
*G06F 9/32* (2006.01)

(52) U.S. Cl. ........................................ 712/240
(58) Field of Classification Search .................. None
See application file for complete search history.

(56) References Cited

U.S. PATENT DOCUMENTS

| | | | | |
|---|---|---|---|---|
| 5,881,278 A * | 3/1999 | Tran et al. | ...................... | 712/242 |
| 5,964,868 A * | 10/1999 | Gochman et al. | .............. | 712/234 |
| 6,189,091 B1 * | 2/2001 | Col et al. | ....................... | 712/240 |
| 6,256,729 B1 * | 7/2001 | Cherabuddi et al. | .......... | 712/238 |
| 6,314,514 B1 * | 11/2001 | McDonald | ...................... | 712/239 |
| 6,560,696 B1 * | 5/2003 | Hummel et al. | ............... | 712/237 |
| 6,633,974 B1 * | 10/2003 | Sinharoy | ......................... | 712/237 |
| 6,745,323 B1 * | 6/2004 | Sinharoy | ......................... | 712/240 |
| 6,910,124 B1 * | 6/2005 | Sinharoy | ......................... | 712/228 |
| 7,093,111 B2 * | 8/2006 | Frommer et al. | ............. | 712/239 |
| 7,200,740 B2 * | 4/2007 | Henry et al. | .................... | 712/239 |
| 7,610,474 B2 * | 10/2009 | Caprioli et al. | ................. | 712/239 |
| 7,975,132 B2 * | 7/2011 | Bean et al. | ..................... | 712/234 |
| 2003/0120906 A1 * | 6/2003 | Jourdan et al. | ................ | 712/242 |
| 2004/0143727 A1 * | 7/2004 | McDonald | ...................... | 712/228 |
| 2008/0109644 A1 * | 5/2008 | Stempel et al. | ............... | 712/237 |
| 2008/0250234 A1 * | 10/2008 | Webber | .......................... | 712/234 |
| 2009/0125707 A1 * | 5/2009 | Olson et al. | .................... | 712/240 |

OTHER PUBLICATIONS

Skadron et al. (Speculative Updates of Local and Global Branch History: A Quantitative Analysis); Journal of Instruction-Level Parallelism, Jan. 2000; 23 pages.*

(Continued)

*Primary Examiner* — Keith Vicary
(74) *Attorney, Agent, or Firm* — Winston Hsu; Scott Margo

(57) ABSTRACT

A method for recovering global history shift register (GHSR) and return address stack (RAS) is provided, which is applicable to an instruction pipeline of a processor and includes the following steps. First, provide a branch recovery table (BRT) and a backup stack. Whenever a branch instruction enters a predetermined stage of the instruction pipeline, add a record in the BRT according to the branch instruction. Whenever a return address is popped from the RAS of the instruction pipeline, push the return address into the backup stack. When flushing the instruction pipeline, determine a removal range of the BRT according to the condition which triggers the pipeline flush. Recover the RAS according to the records in the removal range and the backup stack. Remove all records in the removal range. Recover the GHSR of the instruction pipeline according to the removed records.

12 Claims, 3 Drawing Sheets

OTHER PUBLICATIONS

Chiu et al. (Mechanism for Return Stack and Branch History Corrections under Misprediction in Deep Pipeline Design); This paper appears in: Computer Systems Architecture Conference, 2008. ACSAC 2008. 13th Asia-Pacific; Issue Date: Aug. 4-6, 2008; On pp. 1-8.*

Jourdan et al. (The Effects of Mispredicted-Path Execution on Branch Prediction Structures); This paper appears in: Parallel Architectures and Compilation Techniques, 1996., Proceedings of the 1996 Conference on; Issue Date: Oct. 1996; on pp. 58-67.*

Skadron et al. (Improving Prediction for Procedure Returns with Return-Address-Stack Repair Mechanisms); This paper appears in: Microarchitecture, 1998. MICRO-31. Proceedings. 31st Annual ACM/IEEE International Symposium on Issue Date: Nov. 30-Dec. 2, 1998; on pp. 259-271.*

Desmet et al. (Correct Alignment of a Return-Address-Stack after Call and Return Mispredictions); Desmet, V., Sazeides, Y., Kourouyiannis, C., and De Bosschere, K. 2005. Correct alignment of a return-address-stack after call and return mispredictions. In Workshop on Duplicating, Deconstructing and Debunking. 25—33.*

Kwak et al. (Recovery Logics for Speculative Update Global and Local Branch History); Computer and Information Sciences ISCIS 2006 Lecture Notes in Computer Science, 2006, vol. 4263/2006, 258-266, DOI: 10.1007/11902140_29.*

* cited by examiner

PROCESSOR AND METHOD FOR RECOVERING GLOBAL HISTORY SHIFT REGISTER AND RETURN ADDRESS STACK THEREOF BY DETERMINING A REMOVAL RANGE OF A BRANCH RECOVERY TABLE

BACKGROUND OF THE INVENTION

1. Field of the Invention

The present invention generally relates to a processor and an instruction pipeline thereof, and a storage apparatus and a controller thereof, and more particularly, to a method for recovering a global history shift register (GHSR) and a method for recovering a return address stack (RAS) thereof.

2. Description of Related Art

For achieving an improved efficiency, most current processors employ instruction pipeline configurations. In an instruction pipeline configuration, the branch prediction technology often plays a very important role for allowing each stage of the instruction pipeline working in each clock duty cycle, without being idled.

Typically, a high accurate branch predictor is often facilitated by a global history of the branch instruction for prediction. Such a global history is usually saved in a global history shift register (GHSR). The GHSR needs a correct branch direction for updating, and thus providing an accurate prediction. However, a correct branch direction of a branch instruction cannot be determined until an execution stage. If a newly entered branch instruction needs to use the global history for facilitating prediction before the branch direction is determined and before the GHSR is updated, the prediction accuracy will decline. As such, it is proposed to execute a speculative update to the GHSR. Specifically, when a prediction result of a branch instruction is attained, the prediction result is used to update the GHSR. However, such a speculative update requires a recovering mechanism after the branch direction is determined for assuring the correctness of the global history.

According to a conventional technology, a content of an instant GHSR is saved for each branch instruction, and when a prediction of the branch instruction is found incorrect later, a previously saved content will be loaded to the GHSR for concealing the speculatively updated incorrect branch direction.

According to another conventional technology, two GHSRs are employed. One of the two is written after the branch direction is determined, thus having an absolutely correct content, while another one is provided for speculative updating. Normally, the branch prediction uses the GHSR for speculative updating. However, when the predicted branch direction is found incorrect, the absolutely correct content of the GHSR which is written after the branch direction is determined is loaded to the GHSR for speculative updating for concealing the speculatively updated incorrect branch direction.

Further, in designing a current processor, for the purpose of executing branch prediction for call instructions and return instructions, the instruction pipeline employs a return address stack (RAS) specifically regarding this kind of instructions for storing target addresses of the return instructions corresponding to the call instructions. However, the instruction pipeline may be executed with a flush operation. In this case, an instruction which has been fetched in and should be flushed may include one of the types of branch instructions (e.g., a call instruction or a return instruction) which have executed corresponding actions to the RAS. Therefore, flushing the instruction pipeline may cause the content of the RAS to be incorrect, and may further generate an error of a return address provided to the return instruction.

According to a conventional technology, an instant top-of-stack pointer is recorded when each branch instruction enters the instruction pipeline, and when a prediction error occurs, the top-of-stack pointer is set with a previously recorded value.

According to another conventional technology, an address popped out from the RAS is retained, and when a prediction error occurs, the retained address is pushed into the RAS. However, this conventional technology does not distinguish the order of the retained addresses.

However, the clock rates of the processors are developed to be faster and faster, and correspondingly stages of the instruction pipeline are divided finer and finer, and therefore the branch prediction technology is now demanded for dealing with more and more complicated situations. As such, all of the aforementioned conventional technologies have disadvantages. They either require additional hardware components which increase processing cost, or are incapable of completely recovering a status of the instruction pipeline when a complex prediction error occurs.

SUMMARY OF THE INVENTION

Accordingly, the present invention is directed to a method for recovering a global history shift register (GHSR) of an instruction pipeline of a processor. The method is adapted for recovering a content of the GHSR when any complex prediction error occurs.

The present invention is further directed to provide a method for recovering a return address stack (RAS) of an instruction pipeline of a processor. The method is adapted for recovering the content of the return address stack when any complex prediction error occurs.

The present invention is further directed to provide a processor, adapted for recovering contents of a GHSR and a return address stack (RAS) when any complex prediction error occurs, so as to improve an accuracy of a branch prediction, and further improve an efficiency of the processor.

The present invention provides a method for recovering a GHSR, adapted for an instruction pipeline of a processor. The method includes the following steps. First, a branch recovery table (BRT) is provided. When each of a plurality of branch instructions enters a predetermined stage of the instruction pipeline, a new record is added in the BRT according to the branch instruction. A removal range of the BRT is determined according to the condition which triggers a pipeline flush when the instruction pipeline is flushed. All records in the removal range of the BRT are removed, and the GHSR of the instruction pipeline is recovered according to the removed records.

According to an embodiment of the present invention, if the target address of one of the branch instructions is already confirmed, the oldest record in the BRT is removed.

According to an embodiment of the present invention, the step of recovering the GHSR includes the following steps. First, a quantity of the records in the removal range is counted. Then, the GHSR is shifted back for a number of bits, in which the number of the bits is equal to the quantity of the records. If the pipeline flush is raised by a prediction error of one of the foregoing branch instructions, a correct branch direction of the branch instruction is inserted into the GHSR.

According to an embodiment of the present invention, a length of the foregoing GHSR is longer than a length of the instruction pipeline, and is also longer than a bit number required by the instruction pipeline for branch prediction.

The present invention further provides a method for recovering a return address stack (RAS), adapted for an instruction pipeline of a processor. The method includes the following steps. First, a branch recovery table (BRT) is provided. When each of a plurality of branch instructions enters a predetermined stage of the instruction pipeline, a new record is added in the BRT according to the branch instruction. Then, a backup stack is provided. Whenever a return address is popped out from a return address stack (RAS) of the instruction pipeline, the return address is pushed into the backup stack. A removal range of the BRT is determined according to the condition which triggers a pipeline flush when the instruction pipeline is flushed. Then, the RAS is recovered according to the records in the removal range and the backup stack. And finally, all records in the removal range are removed.

According to an embodiment of the present invention, if the pipeline flush is raised by a prediction error of the branch instruction, the removal range includes all records in the BRT.

According to an embodiment of the present invention, if the pipeline flush is raised by an exception occurring at an exception stage of the instruction pipeline, the foregoing removal range is determined according to a distance from the predetermined stage to the exception stage.

According to an embodiment of the present invention, the method for recovering a RAS further includes the following steps. A timer is provided for keeping a timing value according to a clock signal of the instruction pipeline. Each of the foregoing records includes a timestamp, which is the timing value outputted from the timer when the corresponding branch instruction enters the predetermined stage.

According to an embodiment of the present invention, the step of determining the removal range according to the foregoing distance includes the following steps. Subtract the number of the predetermined stage from the number of the exception stage, and the result is taken as the distance. Subtract the distance from the present timing value of the timer and take the result as a time limit. The removal range includes all records whose timestamps are greater than the time limit.

According to an embodiment of the present invention, each of the records includes a type of a corresponding branch instruction thereof, and the method for recovering the RAS further includes executing the following steps to each record in the removal range. If the type of the corresponding branch instruction of the record is a call instruction, a return address is popped out from the RAS. If the type of the corresponding branch instruction of the record is a return instruction, a return address is popped out from the backup stack and then pushed into the RAS.

The present invention further provides a processor including an instruction pipeline. The instruction pipeline includes a global history shift register (GHSR), and a storage apparatus. The storage apparatus stores a branch recovery table (BRT). The storage apparatus is coupled to the GHSR through the instruction pipeline. When each of a plurality of branch instructions enters a predetermined stage of the instruction pipeline, the processor adds a new record in the BRT according to the branch instruction. When flushing the instruction pipeline, the processor determines a removal range of the BRT according to the condition which triggers the pipeline flush. The processor then removes all records in the removal range, and recovers the GHSR according to the removed records.

The present invention further provides another processor including an instruction pipeline. The instruction pipeline includes a return address stack (RAS), a backup stack, and a storage apparatus. The storage apparatus stores a branch recovery table (BRT). The RAS, the backup stack, and the storage apparatus are coupled to each other through the instruction pipeline. When each of a plurality of branch instructions enters a predetermined stage of the instruction pipeline, the processor adds a new record in the BRT according to the branch instruction. Whenever the processor pops out a return address from the RAS, the processor pushes the return address into the backup stack. When flushing the instruction pipeline, the processor determines a removal range of the BRT according to the condition which triggers the pipeline flush. The processor then recovers the RAS according to the records in the removal range and the backup stack, and then removes all records in the removal range.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
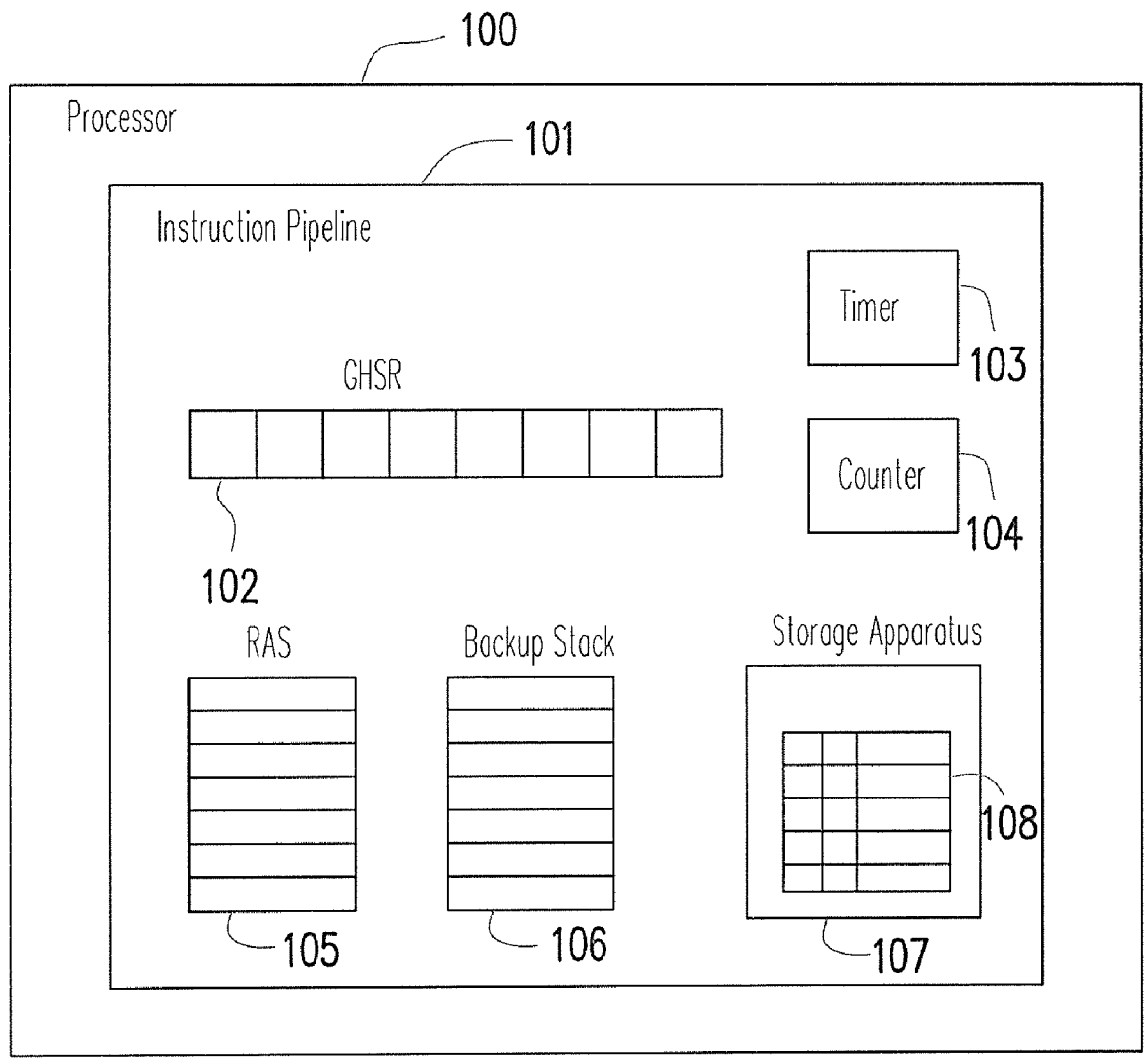
FIG. 1 is a block diagram illustrating a processor according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
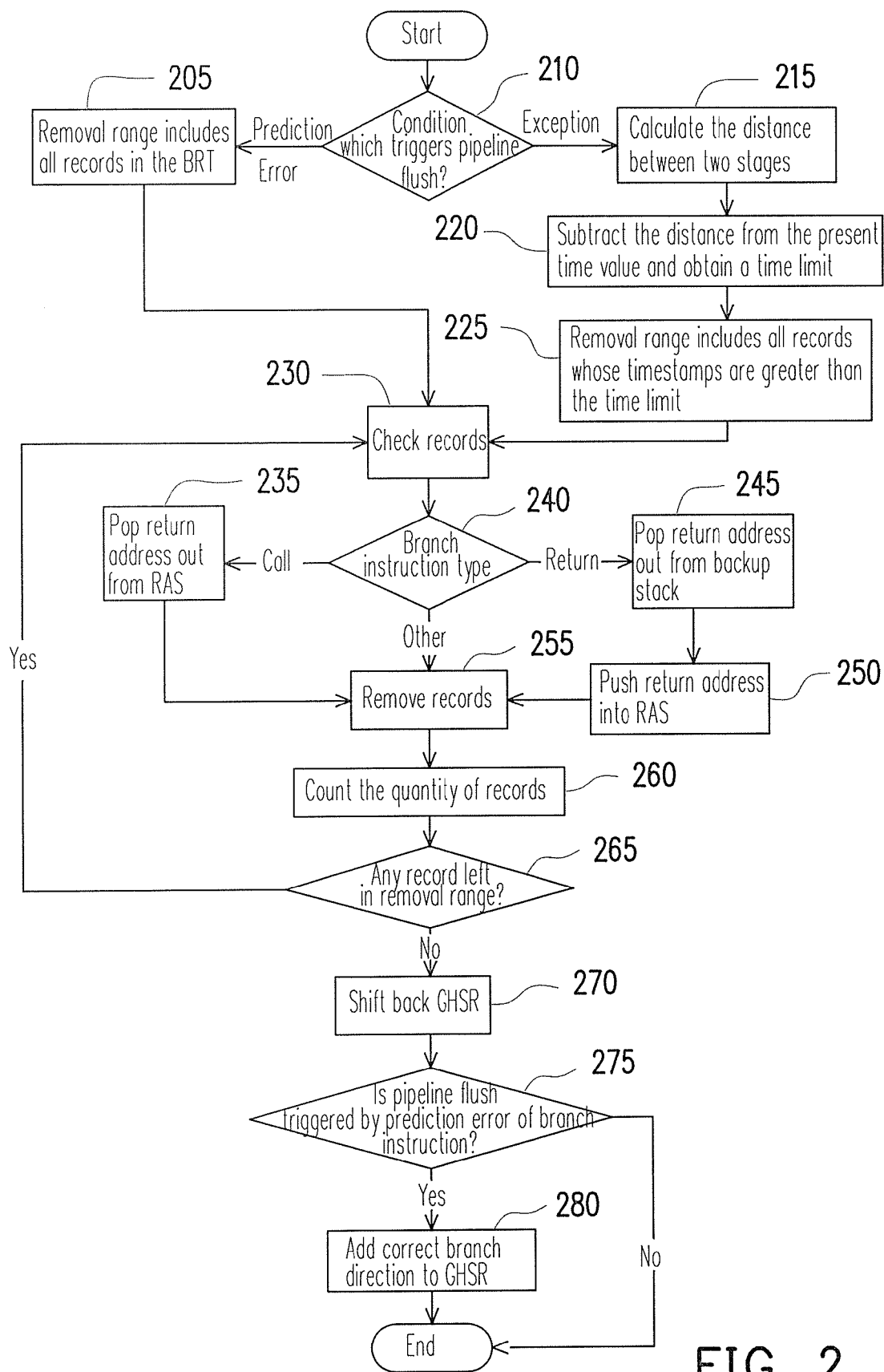
FIG. 2 is a flow chart illustrating a method for recovering a GHSR and a method for recovering a RAS according to an embodiment of the present invention.

FIG. 1 is a block diagram illustrating a processor 100 according to an embodiment of the present invention. Referring to FIG. 1, the processor 100 includes an instruction pipeline 101 for applying the method for recovering a global history shift register (GHSR), and a method for recovering a return address stack (RAS) of the current embodiment. Flows of the two methods are shown in FIG. 2. The instruction pipeline 101 includes a GHSR 102, a timer 103, a counter 104, a RAS 105, a backup stack 106, and a storage apparatus 107. The storage apparatus 107 is provided for storing a branch recovery table (BRT) 108 therein. The GHSR 102, the timer 103, the counter 104, the RAS 105, the backup stack 106, and the storage apparatus 107 are coupled to each other through the instruction pipeline 101.

The GHSR 102 includes a plurality of bits saved therein. Each of the bits represents a branch direction of a branch instruction of the GHSR 102. A bit value of 1 represents that a branch is taken, and a bit value of 0 represents that a branch is not taken.

Figure 3:
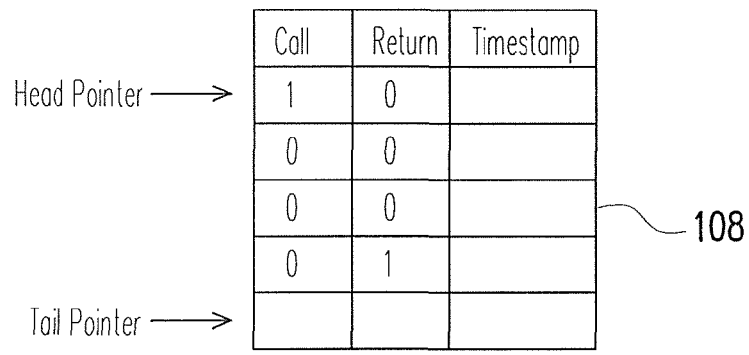
FIG. 3 is a schematic diagram illustrating a branch recovery table (BRT) according to an embodiment of the present invention.

FIG. 3 is a schematic diagram illustrating a BRT according to an embodiment of the present invention. The current embodiment uses a BRT 108 as shown in FIG. 3 for tracking a quantity, types, and fetch orders of the branch instructions of the instruction pipeline 101. As shown in FIG. 3, the BRT 108 is a circular queue having a head pointer and a tail pointer. The BRT 108 includes a plurality of rows. Each row is adapted for saving a record therein. Each record corresponds to a branch instruction entered in the instruction pipeline 101. The head pointer points to the head end of the circular queue, i.e., the oldest and the deepest branch instruction in the instruction pipeline. The tail pointer points to the tail end of the circular queue, i.e., the position for storing the next new record. The head pointer and the tail pointer can be implemented with registers.

When an instruction enters a predetermined stage of the instruction pipeline 101, the processor enquires a branch target buffer (BTB) (not shown in the drawings) according to the instruction so as to learn whether the instruction is a branch instruction. If the instruction is a branch instruction, the processor 100 can learn the branch instruction type of the instruction by a pre-learning method such as pre-decoding or checking the BTB.

If the foregoing instruction is a branch instruction, the processor 100 adds a new record at a position pointed by the tail pointer of the BRT 108 according to the branch instruction. As shown in FIG. 3, each record includes three columns, i.e., a Call column, a Return column and a Timestamp column. The Call column and the Return column are adapted for recording types of the branch instructions. When 1 is presented in the Call column, it indicates that the branch instruction is a call instruction, and when 1 is presented in the Return column, it indicates that the branch instruction is a return instruction. Or otherwise, if the branch instruction is another type of branch instruction, both of the Call column and the Return column are presented with 0. The timer 103 keeps a timing value according to a clock signal of the instruction pipeline 101. When adding a new record in the BRT 108, the processor 100 fills the timing value outputted from the timer 103 when the corresponding branch instruction enters the foregoing predetermined stage in the timestamp column.

The BRT 108 is provided for recording predicted branch instructions, i.e., branch instructions whose branch directions and target addresses are not yet confirmed, in the instruction pipeline 101. Whenever a branch instruction enters the execution stage of the instruction pipeline 101, its branch direction and target address are confirmed. The record corresponding to this branch instruction must be the oldest record at the head end of the BRT 108. The processor 100 then removes the oldest record corresponding to this branch instruction.

Figure 4:
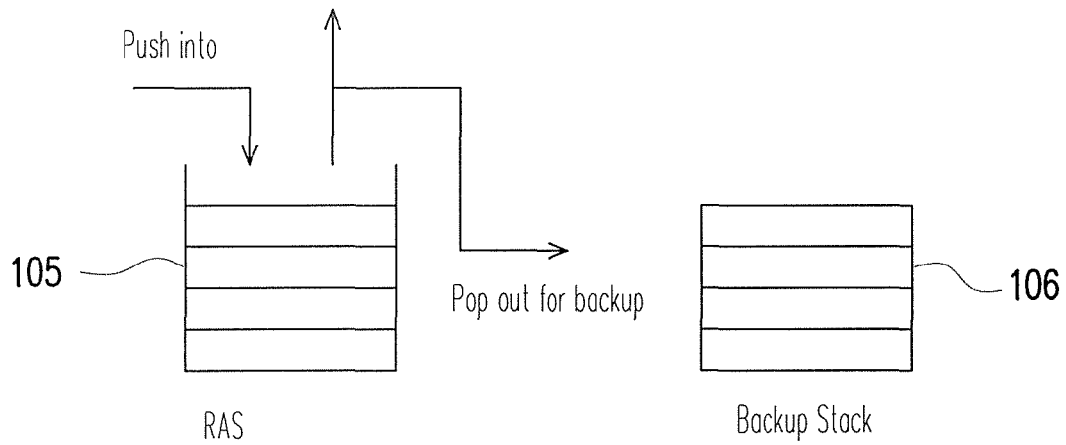
FIGS. 4 and 5 are schematic diagrams illustrating operations of the RAS and the backup stack according to an embodiment of the present invention.

In addition to the RAS 105, the processor 100 further includes a backup stack 106, for storing addresses popped out from the RAS 105, which can be provided for recovering the RAS 105 when a prediction error occurs. FIG. 4 illustrates a normal operation of the RAS 105 and the backup stack 106 according to an embodiment of the present invention. Whenever a call instruction enters the foregoing predetermined stage of the instruction pipeline 101, the processor 100 pushes the corresponding return address into the RAS 105, and whenever a return instruction enters the foregoing predetermined stage, the processor 100 pops a corresponding return address out from the RAS 105, to generate a next content value of a program counter (not shown in the drawings), and push the return address into the backup stack 106.

Figure 5:
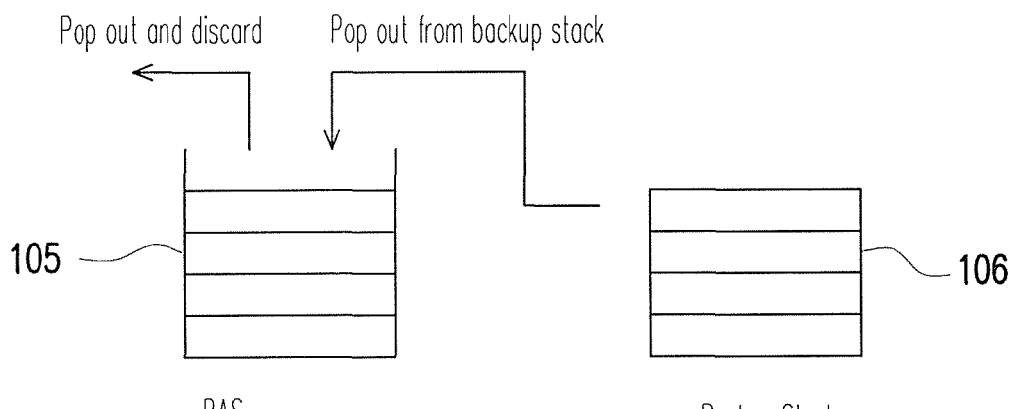

FIG. 5 illustrates a recovery operation of the RAS 105 and the backup stack 106 after a prediction error occurs according to an embodiment of the present invention. The recovery operation of FIG. 5 is on the contrary of the recovery operation of FIG. 4. Referring to FIG. 5, the recovery operation corresponding to a call instruction is to pop the return address thereof out from the RAS 105, while the recovery operation corresponding to a return instruction is to pop the return address thereof out from the backup stack 106 and then push the return address into the RAS 105. Details of the recovery flow will be discussed below.

For maintaining subsequent branch predictions correct, whenever the processor 100 desires to flush the instruction pipeline 101, the processor 100 must recovery contents of the GHSR 102 and the RAS 105. The recovery flow is as discussed below.

First, at step 210, the processor 100 checks out what condition triggers the pipeline flush. When the instruction pipeline 101 is flushed, some of the branch instructions may be flushed away. Correspondingly, the processor 100 removes all or a part of the records in the BRT 108 corresponding to the flushed branch instructions. Different conditions may correspond to different removal ranges. If a prediction error of a branch direction or the target address of the branch instruction is found in an execution stage of the rear end of the instruction pipeline 101, the processor 100 must clean up the instruction pipeline 101, in which the removal range includes all records of the BRT 108, at step 205.

Otherwise, if the pipeline flush is raised by an exception such as an interruption or a mode variation of the processor 100, the processor 100 is needed to flush a part of a front end of the instruction pipeline only, while the corresponding records in the BRT 108 should also be removed. In this case, the processor 100 subtracts the number of the predetermined stage from the number of the stage having the exception, thus obtaining the distance between these two stages, at step 215. Then, at step 220, the processor 100 subtracts the distance from the present timing value of the timer 103 and takes the result as a time limit. At step 225, the removal range of the BRT 108 is determined as all records whose timestamps are greater than the time limit. The distance between the foregoing two stages represents the time the BRT 108 should trace back, i.e., a time period from the moment when the branch instruction is recorded in the BRT 108 at the foregoing predetermined stage till the moment when the exception is triggered.

After determining the removal range of the BRT 108, the processor 100 checks each of the records in the removal range according to a sequence from the newest record to the oldest record, i.e., along the direction from the tail pointer to the head pointer, at step 230. The branch instruction corresponding to each record in the removal range will be flushed from the instruction pipeline 101 by the processor. The content of the GHSR 102 and the RAS 105 have been changed by these branch instructions, and therefore should be recovered correspondingly.

Regarding each of the records in the BRT, the processor 100 determines a type of the branch instruction corresponding to the record by the two columns, the Call column and the Return column, at step 240. If the type of the branch instruction corresponding to the record is determined as a call instruction, it indicates that the processor 100 has previously pushed an incorrect return address into the RAS 105, and therefore the processor 100 pops the return address out from the RAS 105, and discard it at step 235. If the type of the branch instruction corresponding to the record is determined as a return instruction, it indicates that the processor 100 has previously incorrectly popped out the corresponding return address from the RAS 105, and therefore the processor 100 pops the return address out from the backup stack 106 at step 245, and push the return address into the RAS 105 at step 250. Further, if the type of the branch instruction corresponding to the record is neither call instruction nor return instruction, the processor 100 does not need to recover the RAS 105.

Then, at step 255, despite the type of the branch instruction corresponding to the record, the processor 100 removes the record. The counter 104 is provided for counting a quantity of the records in the removal range with a start value of 0. When the processor 100 removes one record, the counter 104 is controlled to add 1 to the counted value at step 260. Then, at step 265, the processor 100 checks whether there is still any unprocessed record in the removal range. If there is, the flow goes back to step 230, in which the processor 100 checks a next record.

After processing all of the records in the removal range, at step 270, the processor 100 shifts back the GHSR 102 for a number of bits, in which the number of the bits is equal to the quantity of the records counted by the counter 104, for the purpose of recovering the content of the GHSR 102 and eliminating an incorrect global history.

Then, the processor 100 checks whether the flush of the instruction pipeline 101 is raised by a prediction error of the branch instruction at step 275. If it is, the processor 100 adds a correct branch direction of the branch instruction in the GHSR 102 at step 280.

In each time of pipeline flush, the GHSR 102 will lose a branch history or even all of the content thereof, so that the subsequent branch prediction has no basis to rely upon. As a solution, the GHSR 102 can be elongated. For example, the length of the GHSR 102, i.e., the bit number thereof, may be set as the sum of the length of the instruction pipeline 101 and the bit number of the instruction pipeline 101 required for branch prediction. The length of the instruction pipeline 101 is a number of the stages thereof. In such a way, even when the processor 100 completely cleans up the instruction pipeline 101 and the GHSR 102 loses the content of the same length, the rest branch history is still available and sufficient for the branch prediction.

In the current processor configuration, the instruction pipeline is desired to be developed deeper and deeper, and correspondingly more stages of the instruction pipeline are required, and the stages are divided finer and finer. The present invention is adapted for recovering complicated branch prediction errors, and is further adapted for the currently deepened instruction pipeline configuration. As such, the present invention can be used for improving an accuracy of the branch prediction, and preventing the instruction pipeline from being idled, and thus improving an efficiency of the processor.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for recovering a global history shift register (GHSR) of an instruction pipeline of a processor, the method comprising:
   providing a branch recovery table (BRT);
   adding a record to the BRT according to each of a plurality of branch instructions when said branch instruction enters a predetermined stage of the instruction pipeline;
   providing a timer for keeping a timing value according to a clock signal of the instruction pipeline wherein each of the records comprises a timestamp and the timestamp is the timing value outputted from the timer when the corresponding branch instruction enters the predetermined stage;
   determining a removal range of the BRT according to a condition which triggers a pipeline flush of the instruction pipeline;
   removing all records in the removal range; and
   recovering the GHSR of the instruction pipeline according to the removed records, wherein if the pipeline flush is triggered by an exception occurring at an exception stage of the instruction pipeline, the removal range is determined by:
   subtracting a number of the predetermined stage from a number of the exception stage and taking the result as a distance; and
   subtracting the distance from a present timing value of the timer and taking the result as a time limit, wherein the removal range comprises all records whose timestamps are greater than the time limit.

2. The method according to claim 1, further comprising:
   removing an oldest record in the BRT when a target address of one of the branch instructions is confirmed.

3. The method according to claim 1, wherein if the pipeline flush is triggered by a prediction error of one of the branch instructions, the removal range comprises all records of the BRT.

4. The method according to claim 1, wherein the step of recovering the GHSR comprises:
   counting a quantity of the records in the removal range;
   shifting back the GHSR for a number of bits, wherein the number of the bits is equal to the quantity of the records; and
   when the pipeline flush is triggered by a prediction error of one of the branch instructions, inserting a correct branch direction of the branch instruction into the GHSR.

5. A method for recovering a return address stack (RAS) of an instruction pipeline of a processor, the method comprising:
   providing a branch recovery table (BRT);
   adding a record to the BRT according to one of a plurality of branch instructions, when said branch instruction enters a predetermined stage of the instruction pipeline;
   providing a timer for keeping a timing value according to a clock signal of the instruction pipeline, wherein each of the records comprises a timestamp and the timestamp is the timing value outputted from the timer when the corresponding branch instruction enters the predetermined stage;
   providing a backup stack;
   pushing a first return address into the backup stack whenever the first return address is popped out from the RAS of the instruction pipeline;
   determining a removal range of the BRT according to a condition which triggers a pipeline flush of the instruction pipeline;
   recovering the RAS according to the records in the removal range and the backup stack; and
   removing all records in the removal range, wherein if the pipeline flush is triggered by an exception occurring at an exception stage of the instruction pipeline, the removal range is determined by:
   subtracting a number of the predetermined stage from a number of the exception stage and taking the result as a distance; and
   subtracting the distance from a present timing value of the timer and taking the result as a time limit, wherein the removal range comprises all records whose timestamps are greater than the time limit.

6. The method according to claim 5, wherein each of the records comprises a type of the corresponding branch instruction, and the method for recovering the RAS further comprises executing the following steps to each record in the removal range:

when the type of the corresponding branch instruction of the record is a call instruction, popping out a second return address from the RAS; and when the type of the corresponding branch instruction of the record is a return instruction, popping out a third return address from the backup stack and pushing the third return address into the RAS.

7. A processor comprising an instruction pipeline, the instruction pipeline comprising:

a timer, keeping a timing value according to a clock signal of the instruction pipeline;

a global history shift register (GHSR); and a storage apparatus, coupled to the GHSR through the instruction pipeline and storing a branch recovery table (BRT), wherein when each of a plurality of branch instructions enters a predetermined stage of the instruction pipeline, the processor adds a record in the BRT according to said branch instruction, wherein each of the records comprises a timestamp, wherein the timestamp is the timing value outputted from the timer when the corresponding branch instruction enters the predetermined stage;

when flushing the instruction pipeline, the processor determines a removal range of the BRT according to a condition which triggers the pipeline flush, removes all records in the removal range, and recovers the GHSR according to the removed records;

if the pipeline flush is triggered by an exception occurring at an exception stage of the instruction pipeline, the processor subtracts a number of the predetermined stage from a number of the exception stage and takes the result as a distance, and subtracts the distance from a present timing value of the timer and takes the result as a time limit, wherein the removal range comprises all records whose timestamps are greater than the time limit.

8. The processor according to claim 7, wherein when a target address of one of the branch instructions is confirmed by the processor, the processor removes an oldest record in the BRT.

9. The processor according to claim 7, wherein if the pipeline flush is triggered by a prediction error of one of the branch instructions, the removal range comprises all records of the BRT.

10. The processor according to claim 7, wherein the processor counts a quantity of the records in the removal range, and shifts back the GHSR for a number of bits, the number of the bits is equal to the quantity of the records; and if the pipeline flush is raised by a prediction error of one of the branch instructions, the processor inserts a correct branch direction of the branch instruction into the GHSR.

11. A processor, comprising an instruction pipeline, the instruction pipeline comprising:

a timer, keeping a timing value according to a clock signal of the instruction pipeline;

a return address stack (RAS), a backup stack, and a storage apparatus, storing a branch recovery table (BRT); wherein the RAS, the backup stack, and the storage apparatus are coupled to each other through the instruction pipeline;

when each of a plurality of branch instructions enters a predetermined stage of the instruction pipeline, the processor adds a record in the BRT according to said branch instruction, wherein each of the records comprises a timestamp, wherein the timestamp is the timing value outputted from the timer when the corresponding branch instruction enters the predetermined stage;

whenever the processor pops out a first return address from the RAS, the processor pushes the first return address into the backup stack;

when flushing the instruction pipeline, the processor determines a removal range of the BRT according to a condition which triggers the pipeline flush, recovers the RAS according to the records in the removal range and the backup stack, and removes all records in the removal range;

if the pipeline flush is triggered by an exception occurring at an exception stage of the instruction pipeline, the processor subtracts a number of the predetermined stage from a number of the exception stage and takes the result as a distance, and subtracts the distance from a present timing value of the timer and takes the result as a time limit, wherein the removal range comprises all records whose timestamps are greater than the time limit.

12. The processor according to claim 11, wherein each of the records comprises a type of the corresponding branch instruction, the processor checks each of the records in the removal range according to a sequence from the newest record to the oldest record; when the type of the corresponding branch instruction of the record is a call instruction, the processor pops out a second return address from the RAS; when the type of the corresponding branch instruction of the record is a return instruction, the processor pops out a third return address from the backup stack and pushes the third return address into the RAS.

* * * * *